July 12, 1966 L. J. KOVACH ETAL 3,259,943
PLASTIC SCREW INJECTOR
Filed Oct. 26, 1964 2 Sheets-Sheet 1
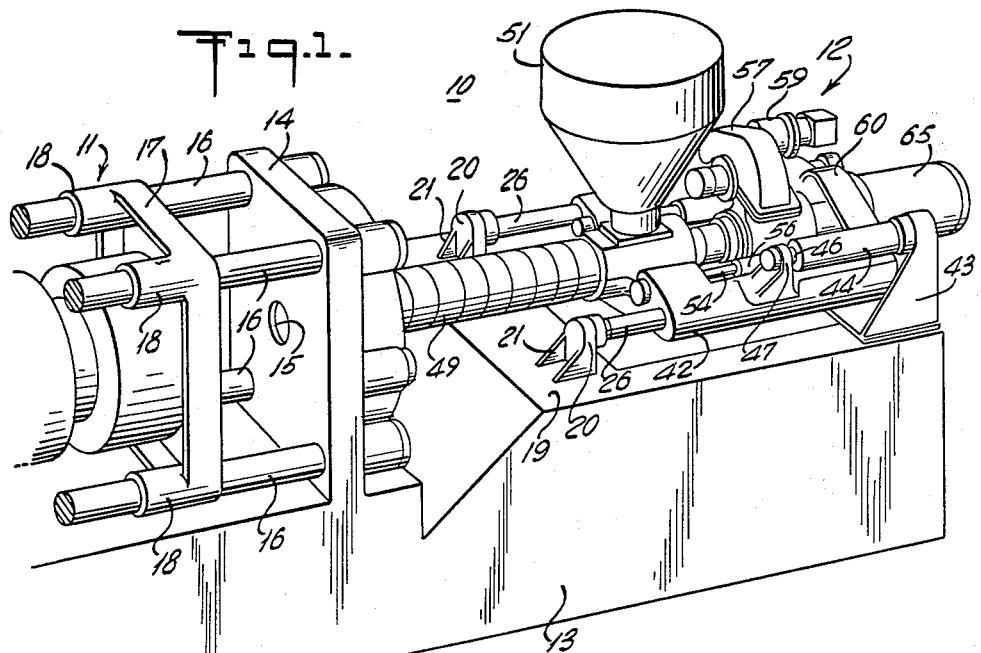
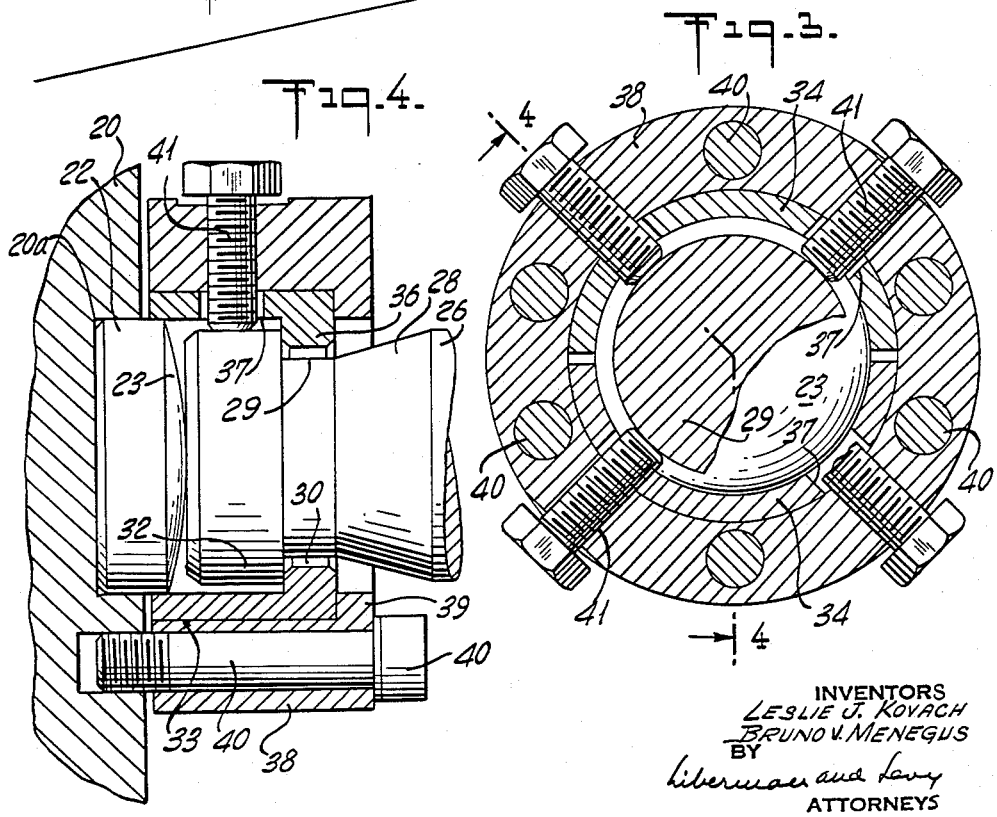
INVENTORS
LESLIE J. KOVACH
BRUNO V. MENEGUS
BY
Liberman and Levy
ATTORNEYS July 12, 1966  L. J. KOVACH ETAL  3,259,943
PLASTIC SCREW INJECTOR Filed Oct. 26, 1964  2 Sheets-Sheet 2

INVENTORS
LESLIE J. KOVACH
BRUNO V. MENEGUS
BY
Lieberman and Levy
ATTORNEYS 3,259,943
PLASTIC SCREW INJECTOR
Leslie J. Kovach, Clifton, and Bruno V. Menegus, Wayne, N.J., assignors to Modern Plastic Machinery Corporation, Clifton, N.J., a corporation of Delaware
Filed Oct. 26, 1964, Ser. No. 406,222
8 Claims. (Cl. 18—30)

The present invention relates generally to improvements in plastic molding equipment and it relates in particular to an improved screw injection plastic molding machine.

In the molding of articles of synthetic organic thermoplastic polymers it has long been conventional to employ an injection molding machine of the ram type. The ram type of molding machine generally includes two sections, the mold section and the plastic injecting section. The mold section consists of a stationary platen and a relatively movable platen in alignment therewith, the platens supporting mating dies which delineate one or more molding cavities with the stationary platen-mounted die being provided with a feed socket and passageways to the cavities. The injection section includes an arrangement for melting and plasticizing the thermoplastic material and a reciprocating piston for injecting the molten plastic into the closed molds. The machine is generally motivated in a scheduled sequence by means of hydraulic cylinders and is electrically timed. Such equipment is large and expensive and represents a large capital investment. The injection section of the ram type of molding machine possesses many drawbacks and disadvantages which are overcome and avoided by injection molding equipment of the screw injection type.

It is, therefore, a principal object of the present invention to provide an improved plastic injection molding machine.

Another object of the present invention is to provide an improved plastic molding machine of the screw injector type.

Still another object of the present invention is to provide an improved screw injecton system which may easily and readily replace the ram injector of a plastic injection molding.

A further object of the present invention is to provide a screw injection molding device of the above nature characterized by its versatility, adaptability, reliability and ease of application and adjustment.

The above and other objects of the present invention will become apparent from a reading of the following description taken in conjunction with the accompanying drawings, wherein:

FIGURE 1 is a partially fragmentary front perspective view of a plastic screw injector molding machine constructed according to and embodying the present invention;

FIGURE 3 is an enlarged sectional view taken along line 3—3 in FIGURE 2; and

FIGURE 4 is a sectional view taken along line 4—4 in FIGURE 3.

Figure 2:
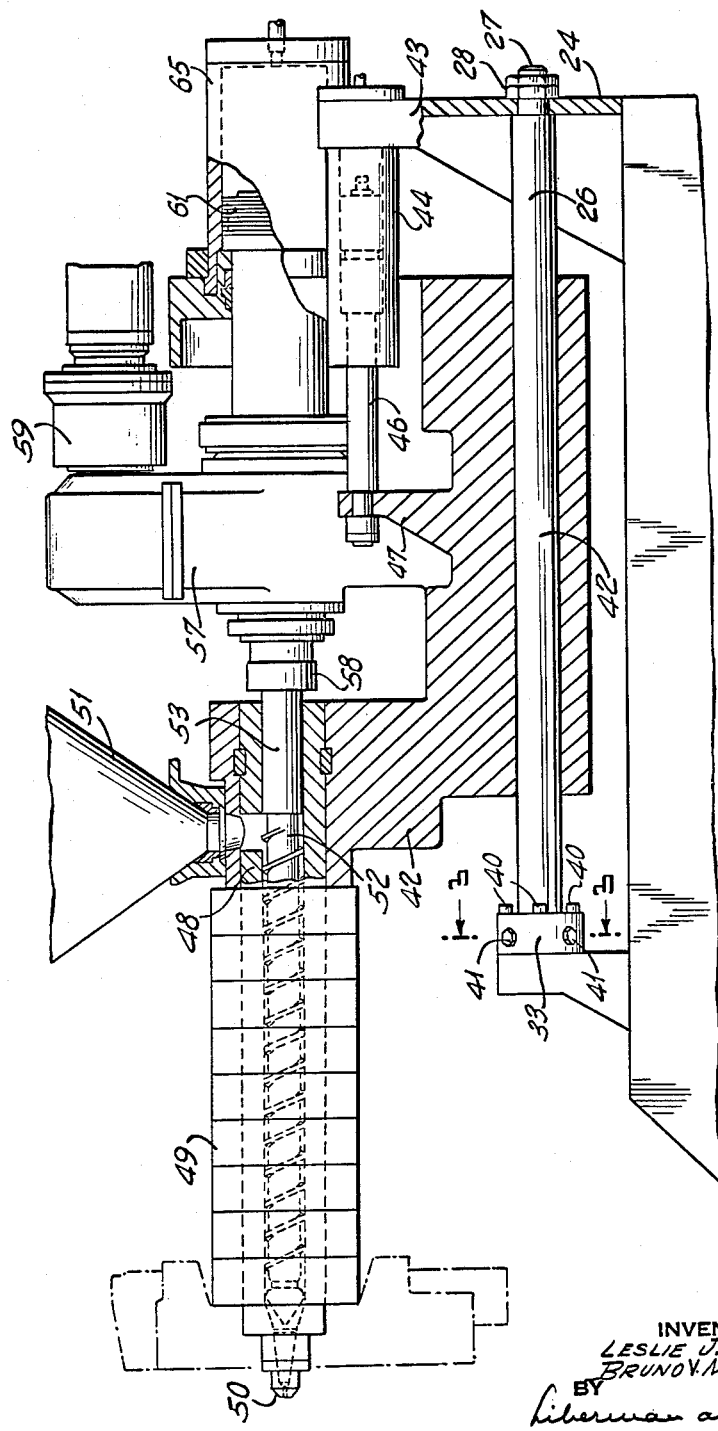
FIGURE 2 is a front elevational view of the screw injector section thereof, partially in section, the stationary platen of the mold section being illustrated by broken line.

In a sense, the present invention contemplates the provision of a screw injection molding machine comprising a longitudinally extending support member, a pair of transversely spaced leading brackets mounted on said support member, a pair of transversely spaced trailing brackets mounted on said support member and aligned with said leading brackets, a pair of transversely spaced longitudinally extending parallel rails extending between and supported by said leading and trailing brackets, means for adjusting the leading ends of said rails in a substantially transverse vertical plane relative to said leading brackets, a carriage engaging and longitudinally slidably along said rails, means for urging said carriage forwardly along said rails, a longitudinally extending extruder barrel mounted on said carriage and terminating in an extrusion nipple at its leading end, an extrusion screw extending within said barrel and axially slidable therein, rotary drive means connected to said screw, and means for axially advancing said screw in said barrel.

According to a preferred form of the improved apparatus, the first brackets are provided with rearwardly facing sockets with which register pad members having rearwardly directed convex first faces. The leading end faces of the rails bear on the convex faces of the pads, and a first collar engages each of the pads and registers with a respective leading end of a rail, and are provided with inwardly directed flanges which engage peripheral grooves in the leading ends of the rails. A second collar engages each of the first collars, and which second collars are each provided with an inwardly directed flange engaging the end faces of the first collar, the second collars being bolted to the first brackets. Peripherally spaced tapped and threaded radial bores are formed in the second collars and are engaged by adjusting screws which bear on the rail peripheral faces. The means for advancing the carriage and the feed screw are hydraulic cylinders suitably associated therewith.

Referring now to the drawings which illustrate a preferred embodiment of the present invention, reference numeral 10 generally designates the improved screw injection machine which includes a molding section 11 and an injection section 12. Mold section 11 and injection section 12 are mounted on a support frame 13, it being noted that molding section 11 and support frame 13 are of the conventional construction and constitute the corresponding components of a ram injection molding machine.

Molding section 11 includes a transversely extending vertical square stationary platen 14 mounted atop support frame 13 provided with a centrally located aperture 15. Means are provided for mounting a stationary die section on the inner face of platen 14, the die being provided in its outer face with a nipple-accommodating socket which communicates by passageways with the die cavities in the usual manner. Secured to and projecting forwardly from the corners of stationary platen 14 are longitudinally extending parallel cylindrical rails 16, the forward ends of which are suitably supported. A square movable platen 17 is provided, having at its corners with longitudinally extending stub sleeves 18 at each corner, which sleeves slidably engage the rails 16. Platen 17 is provided with means on its inner face for supporting a die section mating with or complementary to that mounted in stationary platen 14. A hydraulic cylinder and timing mechanism is associated in the well known manner for advancing and retracting platen 17 to effect the closing and opening of the die sections attendant the injection of molten plastic therebetween the separation of the molded product therefrom.

Injection section 12 is mounted atop a flat horizontal base plate 19 supported by the frame 13 a short distance above the bottom edge of platen 14. A pair of transversely-spaced upwardly directed brackets 20 are mounted on base plate 19 adjacent the leading end thereof and are reinforced against longitudinal thrust by integrally formed leading gusset plates 21 at the rear faces thereof. A circular socket 20a is formed in the rearwardly directed face of each bracket 20 and a cylindrical steel pad or bearing member 22 is snugly nested in said socket. Each bearing member 22 is provided with a rearwardly directed spherical convex face 23 extending beyond the face of bracket 20. A pair of transversely-spaced second brackets 24 is rigidly affixed to frame 13, the brackets being provided at their upper sections with longitudinal bores in longitudinal axial alignment with respective pads 22. If desired, brackets 24 may be formed as an integral part of the frame member.

There is provided a pair of transversely spaced parallel longitudinally extending cylindrical rails 26 terminating at their trailing ends in threaded shanks 27 of reduced cross-section registering with bores in brackets 24 and securely affixed thereto by nuts 28 engaging the threaded shanks 27, brackets 24 being tightly embraced between shoulders at the base of each shank 27 and a face of a respective nut 27. The leading section of each rail 26 is tapered toward the end thereof as at 28 and joins a short cylindrical section 29, thereby to define a peripheral groove 30, and which terminates in an enlarged cylindrical head 32 of diameter equal to that of the main section of rail 26 and of somewhat smaller diameter than pads 22. Heads 32 are provided with flat end faces which bear on the convex faces 23 of pads 22.

A split first collar member 33 is formed of a pair of symmetrical halves which combine to form a complete circular collar which surrounds and is radially spaced from head 32 and engages the peripheral surface of pad 22 which projects beyond the bracket 20. An inwardly directed flange 36 is formed at the trailing edge of collar 33 and registers with groove 30 and engages the rearwardly directed peripheral face of the head 32. A pair of symmetrically disposed radial bores 37 is formed in each of the collar sections 34 peripherally spaced 90°.

An outer second collar 38 engages first collar 33 and termiantes at its trailing end in an inwardly directed peripheral flange 39 which abuts the trailing face of collar 33, the opening delineated by the inner edge of the flange 39 being of greater diameter than that of head 32. A plurality of longitudinal bores are formed in the collar 38 and bolts 40 project through the bores and engage corresponding rapped bores formed in the rearwardly directed face of bracket 20 to releasably tightly secure collars 33 and 38 to brackets 20 and bring heads 32 into tight abutment with pads 22. The trailing faces of the collars 33 and 38 are coplanar and spaced from the rear face of bracket 20.

In order to permit horizontal and vertical adjustment of heads 32 and thus the leading ends of rails 26, four tapped radial bores are formed in each collar 38, equally peripherally spaced and in axial alignment with the bores 37. The tapped bores are engaged by hex head adjusting screws 41 which register with bores 37 and bear on the periphery of head 32. Thus the positions of the leading ends of rails 26 may be adjusted by correspondingly adjusting screws 41.

A main carriage 42 is supported for longitudinal movement by and along rails 26 and is provided with longitudinal bores engaging said rails. A pair of integrally formed transversely spaced brackets 43 is mounted atop and directed upwardly from the trailing end of support plate 19, and there is mounted on each thereof a forwardly directed hydraulic cylinder 44 which is parallel to and located above the corresponding rail 26. Each hydraulic cylinder 44 is provided with a piston rod 46 which is connected to a respective bracket 47 projecting upwardly from carriage 42. The opposite end of each hydraulic cylinder 44 is connected by way of a conventional valve system to a source of hydraulic fluid under pressure to permit the selective advance and retraction of the piston rods 46 and the main carriage 42 along rails 26.

Mounted on main carriage 42 and movable therewith is a forwardly projecting longitudinal extruder barrel 48 provided with surrounding heating coils 49 and terminating at its leading end with a die socket-mating or coupling nipple 50 of conventional configuration, having a tapered end face and a funneled axial bore. A feed hopper 51 is located atop the trailing end of barrel 48 and communicates with the interior thereof through a feed opening formed in the upper face of the barrel. A plunger or piston type plasticizer and feed screw 52 extends coaxially of the barrel 48 and terminates at its trailing end in a cylindrical shank 53, which rotatably and slidably registers with the axial bore formed in the trailing end of the barrel 48 and projects rearwardly beyond the barrel 48.

A pair of transversely spaced longitudinally extending cylindrical rails 54 is mounted on main carriage 42 and slidably longitudinally support an auxiliary carriage 56 provided with longitudinally extending side sleeves which engage the rails 54. A gear box transmission unit 57 is supported by carriage 56 and has an output shaft coaxial with and connected to feed screw shank 53 by a coupling member 58. The input shaft of transmission unit 57 is connected to the output shaft of a drive motor 59 which is advantageously of the hydraulic type.

In order to effect the advance of piston screw 52 attendant the plastic injection step, a hydraulic cylinder 65 is mounted on a flange-reinforced bracket 60 carried by and extending transversely across the trailing end of main carriage 42, and projects rearwardly therefrom. Piston 61 associated with cylinder 65 is connected to auxiliary carriage 56, and the trailing section of cylinder 65 is connected by way of a three way valve to a source of high pressure hydraulic fluid and to exhaust.

Considering now the application of the improved screw injection assembly described above and its application to a conventional injection molding machine, the ram injection component of the latter is removed and replaced by the screw injector section 12, in the assembled condition as above set forth. A set of mold sections are mounted on the stationary and movable platens 14 and 17 with the stationary die injection socket being rearwardly directed and in coaxial alignment with aperture 15. Screw bolts 40 are then loosened slightly to permit the adjustment of rails 26. Thereafter, screw bolts 41 are adjusted to bring extruder nipple 50 into accurate coaxial registry with the die socket and when this is accomplished screws 40 are tightened and the equipment is ready for use.

The injector section is placed in condition for operation by connecting the trailing sections of cylinders 44 to the high pressure oil line whereby to advance the main carriage 42 and the extruder barrel 49 and bring nipple 50 into tight engagement with the stationary die feed socket. Thereafter, the screw injector operates in a timed injection sequence in the known manner. The worm 52 is advanced with the auxiliary carriage 56 and the drive assembly by the cylinder and piston 65 and 61 to effect the injection of the plastic. Following the injection cycle worm 52 is rotated by drive motor 59 and transmission unit 57 to effect the plasticizing and the advance of fluid plastic toward the leading end of barrel 14, and the retraction of the screw 52, the auxiliary carriage 56, the drive motor 59 and transmisison unit 57, the piston 61, and the cylinder 65 having been previously connected to exhaust.

While there has been described and illustrated a preferred embodiment of the present invention it is apparent that numerous alterations, omissions, and additions may be made without departing from the spirit thereof.

What is claimed is:

1. A screw injection molding machine comprising a longitudinally extending support member, a pair of transversely spaced leading brackets mounted on said support member, a pair of transversely spaced trailing brackets mounted on said support member and aligned with said leading brackets, a pair of transversely spaced longitudinally extending parallel rails extending between and supported by said leading and trailing brackets, means for adjusting the leading ends of said rails in a substantially vertical plane relative to said leading brackets, a carriage longitudinally slidably engaging said rails, means for urging said carriage forwardly along said rails, a longitudinally extending extruder barrel mounted on said carriage and terminating in an extrusion nipple at its leading end, an extrusion screw extending within said barrel and axially slidable therein, rotary drive means connected to said screw, and means for axially advancing said screw in said barrel.

2. The screw injection molding machine of claim 1 wherein said carriage urging means comprises a hydraulic cylinder and piston connected between said carriage and a stationary mount located on said support member.

3. A screw injection molding machine comprising a longitudinally extending support member, a pair of transversely spaced leading brackets mounted on said support member, a pair of transversely spaced trailing brackets mounted on said support member and aligned with said leading brackets, a first pad carried by each of said first brackets and having rearwardly directed first faces, a pair of transversely spaced longitudinally extending parallel rails extending between and supported by said leading and trailing brackets and terminating at their leading ends in forwardly directed second faces abutting the first faces of said pads, at least one of each pair of said first and second faces being convex, means for vertically and horizontally adjusting the leading ends of said rails, means for releasably securing the leading ends of said rails with said first and second faces in abutment, a carriage longitudinally slidably engaging said rails, means for urging said carriage forwardly along said rails, a longitudinally extending extruder barrel mounted on said carriage and terminating in an extrusion nipple at its leading end, an extrusion screw extending within said barrel and axially slidable therein, rotary drive means connected to said screw, and means for axially advancing said screw in said barrel.

4. The screw injection molding machine of claim 3 wherein the first faces of said pads are convex.

5. The screw injection molding machine of claim 3 wherein said rails are provided with peripheral grooves shortly trailing said second faces, and said rail leading end securing means comprise a first collar engaging each of said pads and the corresponding leading ends of said rails, and provided with inwardly directed flanges engaging said rail grooves, and means for securing said first collars to said first brackets.

6. The screw injection molding machine of claim 5 wherein said first collar securing means includes a second collar encircling each of said first collars and provided with inwardly directed flanges engaging the outer end faces of said first collars, and means securing said second collars to said first brackets.

7. The screw injection molding machine of claim 3 wherein said rail adjusting means comprises a collar registering with the leading end of each said rails and secured to said brackets, each of said collars having a plurality of peripherally spaced tapped axial bores formed therein, and an adjusting screw registering with each of said tapped bores and bearing on the leading peripheral surfaces of said rails.

8. A screw injection molding machine comprising a longitudinally extending support member, a pair of transversely spaced leading brackets mounted on said support member and having rearwardly directed sockets formed therein, a pair of transversely spaced trailing brackets mounted on said support member and aligned with said leading brackets, a pad member engaging each of said first bracket sockets and having rearwardly directed convex faces, a pair of transversely spaced longitudinally extending parallel rails extending between said brackets, said rails having trailing ends secured to said second brackets and leading end faces bearing on said pad convex faces and having peripheral grooves formed therein rearwardly of said leading end faces, a first collar coaxially registering with each of said pads and said rail leading ends and provided with inwardly directed peripheral flanges engaging said rail grooves, a second collar engaging each of said first collars and having inwardly directed peripheral flanges engaging the end face of the first collar and a plurality of peripherally spaced tapped radial bores, means releasably securing said second collars to said first brackets, adjusting screws engaging said tapped bores and bearing on the periphery of said rail, a carriage longitudinally slidably engaging said rails, means for urging said carriage forwardly along said rails, a longitudinally extending extruder barrel mounted on said carriage and terminating in an extrusion nipple at its leading end, an extrusion screw extending within said barrel and axially slidable therein, rotary drive means connected to said screw, and means for axially advancing said screw in said barrel.

References Cited by the Examiner

UNITED STATES PATENTS

| | | | |
|---|---|---|---|
| 3,068,521 | 12/1962 | Gasper et al. | 18—12 X |
| 3,162,900 | 12/1964 | Huelskawp | 18—12 X |
| 3,169,275 | 2/1965 | Compton et al. | 18—12 X |
| 3,204,294 | 9/1965 | Brochette | 18—12 X |

WILLIAM J. STEPHENSON, *Primary Examiner.*